UNITED STATES PATENT OFFICE.

GEORGE W. SNYDER, OF LOS ANGELES, CALIFORNIA, ASSIGNOR TO CALIFORNIA DRUG AND CHEMICAL COMPANY, OF LOS ANGELES, CALIFORNIA, A CORPORATION OF CALIFORNIA.

WATERPROOFING MATERIAL.

1,109,799. Specification of Letters Patent. Patented Sept. 8, 1914.

No Drawing. Application filed August 5, 1912. Serial No. 713,470.

*To all whom it may concern:*

Be it known that I, GEORGE W. SNYDER, a citizen of the United States, residing at Los Angeles, in the county of Los Angeles and State of California, have invented a new and useful Waterproofing Material, of which the following is a specification.

This invention relates to a material for waterproofing cement, concrete, wood, cloth or other materials, and the main object of the invention is to provide a material in the form of a solution capable of application to the surface to be waterproofed, and serving to render the surface waterproof at a minimum of expense, or the material may be incorporated with cement in the process of manufacture.

The waterproofing material or preparation constituting my invention consists essentially of aluminum soap containing an excess of fat or saponifiable wax, said excess fat or wax being emulsified with the soap and the material also containing alkali and sulphur, and I also prefer to use an adhesive substance as one of the ingredients, for example, glue, gelatin, or other mucilaginous substance, together with a preservative therefor. The material is prepared in the form of a solution with a suitable solvent, preferably water.

The saponifiable or fatty constituent of the soap preferably consists of a saponifiable wax, such as Japan wax, or it may consist of any suitable fat or mixture of wax and such fat.

The alkali and sulphur is preferably added in the form of a solution herein called the lye-sulfur solution, the formula for the preparation being as follows: Sodium hydrate (98%) 1 to 3½ lb., Japan wax 20 to 28 lb., lye-sulfur solution ½ gal., glue 20 to 24 lb., alum 3 to 16 lb., potassium nitrate 2 to 4 lb., water, sufficient to make 100 gallons. The formula for the lye-sulfur solution is as follows: sulfur 5 lb., sodium hydrate 30 oz., water 5 gal.

The method or process of preparing the complete solution may be carried out as follows: The wax or other fatty material is saponified by boiling with a solution of alkali such as caustic soda or potash, the wax and alkali being taken, for example, in proportion above stated, which will provide an excess of wax which is emulsified by the soap formed. The solution resulting from the saponification is then mixed with the lye-sulfur solution in the proportions above stated and with the glue and the salt of aluminum, for example, alum is then added. The potassium or sodium nitrate is then added as a preservative. The solution of alkali may contain water in proportion of about thirty gallons to the quantity of alkali above given. The glue is added in the form of a solution, say about fifty gallons of water to the amount of glue above given. The alum may be added dry or in solution, in water. In place of alum, I may use any other salt or aluminum which is soluble in the water or solvent used in the process.

The waterproofing solution prepared as above described contains in each one hundred gallons of solution in water, 1.2 to 3.7 pounds of sodium hydrate, 20 to 28 pounds Japan wax, ½ pound sulfur, 20 to 24 pounds glue, 3 to 16 pounds alum, and 2 to 4 pounds potassium nitrate.

What I claim is:

1. A waterproofing solution containing in each one hundred gallons of solution in water, 1.2 to 3.7 pounds sodium hydrate, 20 to 28 pounds fatty material, ½ pound sulfur, 20 to 24 pounds glue, 3 to 16 pounds alum, and 2 to 4 pounds potassium nitrate.

2. A waterproofing solution containing in each one hundred gallons of solution in water, 1.2 to 3.7 pounds sodium hydrate, 20 to 28 pounds Japan wax, ½ pound sulfur, 20 to 24 pounds glue, 3 to 16 pounds alum, and 2 to 4 pounds potassium nitrate.

In testimony whereof I have hereunto set my hand at Brawley, California, this 25th day of June, 1912.

GEORGE W. SNYDER.

In presence of—
FRANCIS B. CHAPMAN,
W. H. WHELAN.